(12) United States Patent
Tomioka

(10) Patent No.: US 7,167,318 B2
(45) Date of Patent: Jan. 23, 2007

(54) ZOOM OPTICAL SYSTEM

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/352,236

(22) Filed: Feb. 13, 2006

(65) Prior Publication Data
US 2006/0203355 A1    Sep. 14, 2006

(30) Foreign Application Priority Data
Mar. 11, 2005    (JP)    ............................. 2005-068644

(51) Int. Cl.
*G02B 15/14*    (2006.01)
(52) U.S. Cl. ...................... 359/682; 359/683; 359/684; 359/685; 359/691; 359/717; 359/740
(58) Field of Classification Search ................ 359/676, 359/680, 682, 683–685, 691, 717, 740, 793
See application file for complete search history.

(56) References Cited

U.S. PATENT DOCUMENTS

| | | | | |
|---|---|---|---|---|
| 6,154,322 | A * | 11/2000 | Nakayama | 359/691 |
| 6,308,011 | B1 * | 10/2001 | Wachi et al. | 359/689 |
| 6,498,687 | B1 * | 12/2002 | Sekita et al. | 359/680 |
| 6,545,819 | B1 * | 4/2003 | Nanba et al. | 359/680 |
| 6,597,513 | B1 * | 7/2003 | Minefuji | 359/689 |
| 6,643,072 | B1 * | 11/2003 | Mihara | 359/686 |
| 6,762,887 | B1 * | 7/2004 | Tomioka | 359/691 |
| 6,934,092 | B1 * | 8/2005 | Nakayama | 359/691 |
| 7,050,240 | B1 * | 5/2006 | Tomioka | 359/680 |
| 2005/0036210 | A1 * | 2/2005 | Iijima | 359/680 |
| 2005/0078380 | A1 * | 4/2005 | Tomioka | 359/680 |
| 2006/0109564 | A1 * | 5/2006 | Sawamoto | 359/691 |

FOREIGN PATENT DOCUMENTS

JP    2003-287677    10/2003

* cited by examiner

*Primary Examiner*—Evelyn A. Lester
(74) *Attorney, Agent, or Firm*—Arnold International; Jon W. Henry; Bruce Y. Arnold

(57) ABSTRACT

A simple two-group zoom optical system that favorably corrects aberrations includes, in order from the object side, a first lens group of negative refractive power, a stop, and a second lens group of positive refractive power. The first lens group includes, in order from the object side, a lens element having negative refractive power and a meniscus shape with its concave surface on the image side, a biconcave lens element, and a lens element having positive refractive power. The second lens group includes, in order from the object side, a lens element having positive refractive power and at least one aspheric surface, a lens element having negative refractive power, and a biconvex lens element. Certain conditions are satisfied that relate to the focal lengths of the zoom optical system, the focal lengths of the two lens groups, and to the Abbe numbers of lens elements.

6 Claims, 6 Drawing Sheets

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

ZOOM OPTICAL SYSTEM

TECHNICAL FIELD OF THE INVENTION

The present invention relates to a zoom optical system with a field angle of about one hundred thirty degrees that can be used in various kinds of video cameras and electronic still cameras that include CCDs (Charge Coupled Devices) as image detectors, and relates particularly to a small, wide-angle zoom optical system with a high variable power.

BACKGROUND OF THE INVENTION

There is an increased demand for monitoring cameras to operate in unmanned installations at night, and such cameras with zooming capabilities have recently been sought. Such a zoom optical system for a monitoring camera requires the ability to identify an object even in an environment of low illumination and that the zoom optical system is capable of providing a wide field angle (i.e., a wide-angle of view). However, it has also been increasingly desired that the zoom optical system be compact, have a high zoom ratio, and provide good optical performance throughout the entire range of zooming.

The wide-angle zoom lens described in Japanese Laid-Open Patent Application 2003-287677 is cited as an example of such a zoom optical system.

The zoom lens described in Japanese Laid-Open Patent Application 2003-287677 has a compact two-group construction with lens groups having negative and positive refractive power arranged in order from the object side. Such a construction, which has an object-side lens group of negative refractive power, has the strong point that it is suited to achieving a wide angle and ensuring an appropriate back focus distance. However, with this two-group construction of lens groups having negative and positive refractive power arranged in order from the object side, because the entire lens system becomes asymmetric and fluctuations in aberrations during zooming increase, if the lens system is to provide a bright image, maintaining good optical performance over the entire zoom range is a problem.

The zoom lens described in this Japanese application may be made small and with a large aperture ratio by arranging an aspheric lens on the image side of a lens element having positive refractive power and a convex surface on the object side of the second lens group.

Additionally, the zoom optical system described in Japanese Patent Application 2004-279168 has the same lens construction as that disclosed in Japanese Laid-Open Patent Application 2003-287677. This zoom optical system also satisfies certain conditions in order to achieve a wider field angle in addition to satisfying various other criteria discussed in Japanese Laid-Open Patent Application 2003-287677.

However, a demand to arrange monitoring cameras in a larger number of places has also increased in view of the needs of society for such monitoring cameras, thus increasing the demand for more inexpensive zoom optical systems with simpler construction for such monitoring cameras. Of course, in order to achieve this, there is no desire to sacrifice compactness, zoom ratio, or optical performance, but rather a desire that these features at least remain the same or be improved or increased.

BRIEF SUMMARY OF THE INVENTION

The present invention relates to an inexpensive zoom optical system with a simpler construction than previous zoom optical systems, but that has a compactness, zoom ratio, and optical performance that are at least equal to that of previous zoom optical systems.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
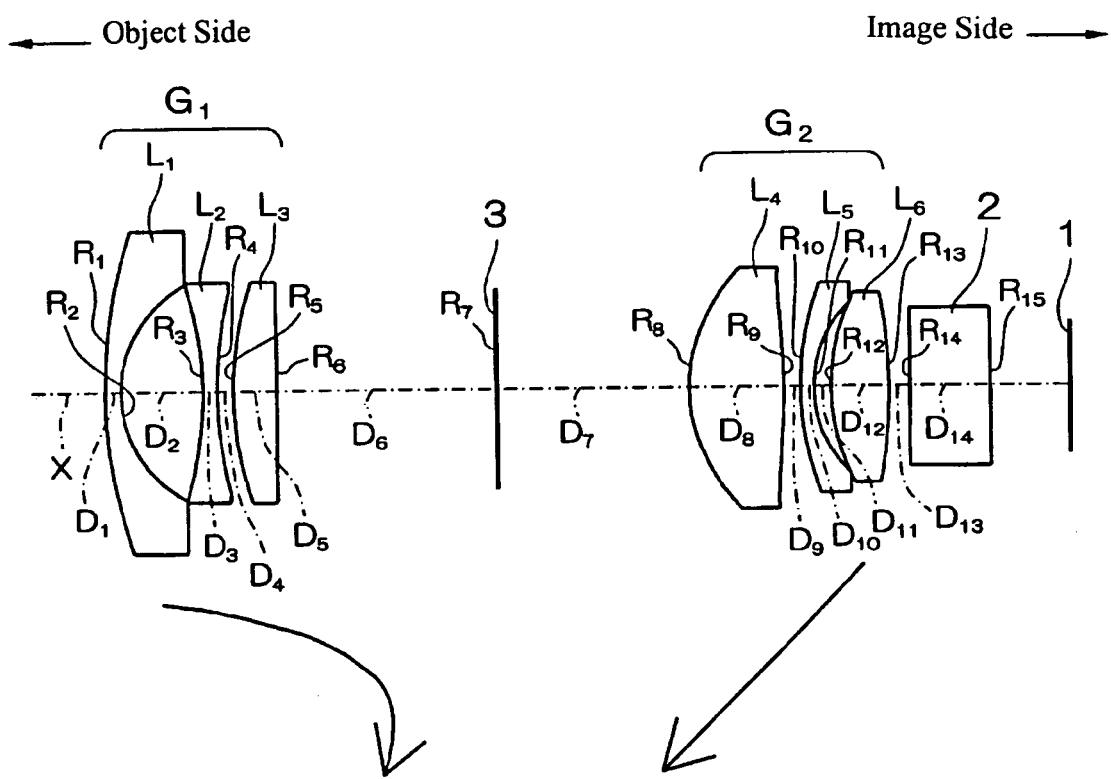
FIG. 1 shows a cross-sectional view of Embodiment 1 of the zoom optical system of the present invention at the wide-angle end.

A general description of a two-group zoom optical system of the present invention will first be described with reference to FIG. 1 that shows Embodiment 1. In FIG. 1, a horizontal arrow at the upper left labeled "Object side" points in the direction indicating the object side of the zoom optical system and a horizontal arrow at the upper right labeled "Image side" points in the opposite direction indicating the image side of the zoom optical system. In FIG. 1, lens elements are referenced by the letter L with a subscript number denoting their order from the object side of the zoom optical system along the optical axis X, from $L_1$ to $L_6$. Similarly, radii of curvature of the surfaces of the various optical elements, including the lens surfaces, are referenced by the letter R with a subscript number denoting their order from the object side of the zoom optical system, from $R_1$ to $R_{15}$. The on-axis surface spacings along the optical axis X of the various optical surfaces are referenced by the letter D with a subscript number denoting their order from the object side of the zoom optical system, from $D_1$ to $D_{14}$. In the same manner, the two lens groups are labeled $G_1$ and $G_2$ in order from the object side of the zoom optical system and the lens elements belonging to each lens group are indicated by the brackets adjacent the labels $G_1$ and $G_2$.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom optical system. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, a stop 3, such as a diaphragm, that controls the amount of light that passes through the zoom optical system is included between the lens group $G_1$ that has negative refractive power and the lens group $G_2$ that has positive refractive power. Also as shown in FIG. 1, a filter part 2, such as an infrared cutoff filter, is arranged on the image side of the second lens group $G_2$. A light beam incident along the optical axis X from the object side is imaged at an imaging position on an image pickup plane 1 of a solid state image pickup element (not shown in the drawings), such as a CCD (Charge-Coupled Device).

The zoom optical system includes only two lens groups to form a two-group zoom optical system. The zoom optical system zooms from the wide-angle end to the telephoto end by moving the second lens group $G_2$ toward the object side along the optical axis X in order to increase the focal length of the zoom optical system and compensates for movement of the image plane caused by this movement of the second lens group $G_2$ by moving the first lens group $G_1$ first toward the image side as the zoom optical system zooms from the wide-angle end to the telephoto end of the zoom range and then moving the first lens group $G_1$ toward the object side at the telephoto end of the zoom range. Downward arrows at the bottom of FIG. 1 indicate the directions of movement along the optical axis X of the first lens group $G_1$ and the second lens group $G_2$ when zooming from the wide-angle end to the telephoto end. The first lens group $G_1$ also functions as a focusing lens group by moving along the optical axis X.

The first lens group $G_1$ includes three lens components that are lens elements, in order from the object side, as follows: a first lens element L1-1 (corresponding to first lens element $L_1$ of FIG. 1) having negative refractive power; a second lens element L1-2 (corresponding to second lens element $L_2$ of FIG. 1) having negative refractive power; and a third lens element L1-3 (corresponding to third lens element $L_3$ of FIG. 1) having positive refractive power. In the zoom optical system shown in FIG. 1, the first lens element $L_1$ has a meniscus shape with its concave surface on the image side, the second lens element $L_2$ is a biconcave lens element having surfaces of different curvature, and the third lens element $L_3$ has surfaces of different curvature with a convex surface on the object side. The first lens element $L_1$ has a shape suitable for achieving a wide-angle view. In FIG. 1, the second lens element $L_2$ is shown as a biconcave lens element with its surface of greater curvature on the object side, and the third lens element $L_3$ is shown as a biconvex lens element with its surface of greater curvature on the object side. However, the second lens element $L_2$ can be replaced by a biconcave lens element with its surface of greater curvature on the image side, and the third lens element $L_3$ can be a plano-convex lens element with its convex surface on the object side or a lens element having positive refractive power and a meniscus shape with its convex surface on the object side and having a greater absolute magnitude of curvature than the other surface.

The second lens group $G_2$ includes three lens components that are lens elements, in order from the object side, as follows: a fourth lens element L2-1 (corresponding to fourth lens element $L_4$ of FIG. 1) having positive refractive power and an aspheric surface at least on the object side; a fifth lens element L2-2 (corresponding to fifth lens element $L_5$ of FIG. 1) having negative refractive power; and a sixth lens element L2-3 (corresponding to sixth lens element $L_6$ of FIG. 1) having a biconvex shape. In the zoom optical system shown in FIG. 1, the fourth lens element $L_4$ is a biconvex lens element with aspheric surfaces on both sides, the fifth lens element $L_5$ has negative refractive power and a meniscus shape with its concave surface on the image side, and the sixth lens element $L_6$ has the desired biconvex shape. The choice of a biconvex shape of the fourth lens element $L_4$ is determined from the fact that a convex shape of large curvature is suitable for converging a light beam from the object side and from the fact that a convex shape on the image side is suitable for improving chromatic aberration correction on the image side. In FIG. 1, as a preferable example, the sixth lens element $L_6$ is shown as a biconvex lens element having surfaces of different curvature with its surface of greater curvature on the object side, but a biconvex lens element with its surface of greater curvature on the image side can also be used. The prescriptions of the shapes of the various lens elements of the first and second lens groups may be varied, but the shapes selected for each lens group are preferably determined based on the shapes of the lens elements of both lens groups considered together.

The lens surface or surfaces of the fourth lens element L2-1 (corresponding to fourth lens element $L_4$ of FIG. 1) of the second lens group $G_2$ that are aspheric are defined using the following equation:

$$Z=[(Y^2/R)/\{1+(1-K\cdot Y^2/R^2)^{1/2}\}]+\Sigma(A_i\cdot Y^i) \qquad \text{Equation (A)}$$

where
  Z is the length (in mm) of a line drawn from a point on the aspheric lens surface at a distance Y from the optical axis to the tangential plane of the aspheric surface vertex,
  R is the radius of curvature (in mm) of the aspheric lens surface on the optical axis,
  Y is the distance (in mm) from the optical axis,
  K is the eccentricity, and
  $A_i$ is the ith aspheric coefficient, and the summation extends over i.

In embodiments of the invention disclosed below, only aspheric coefficients $A_3$–$A_{16}$ are non-zero.

The increase in aberrations and decrease in imaging performance related to light rays passing through the periphery of the relatively large diameter fourth lens element L2-1 (corresponding to fourth lens element $L_4$ of FIG. 1) can be reduced by including at least one aspheric surface as described above. The correction of spherical aberration is easily improved as compared to trying to improve spherical aberration by instead using an aspheric surface on the lens element on the image side of this lens element.

Furthermore, in the zoom optical system of the present invention, design considerations, such as those that lead to the fifth lens element L2-2 (corresponding to fifth lens element $L_5$ of FIG. 1) having negative refractive power and a meniscus shape, result in the preference that the fourth lens element L2-1 (corresponding to fourth lens element $L_4$ of FIG. 1) be selected as the aspheric lens element.

The object-side curvature of the fourth lens element $L_4$ (L2-1) of the second lens group $G_2$ is increased to converge the beam diverged by the first lens group $G_1$ having negative refractive power. Thus, the object-side surface of the fourth lens element $L_4$ (L2-1) has increasing positive refractive power away from the optical axis, so that the closer to the periphery, the more the spherical aberration is overcorrected.

In the zoom optical system of the present invention, the fifth lens element $L_5$ (L2-2) having negative refractive power need not have large negative refractive power at the periphery and may have a meniscus shape.

Thus, the zoom optical system of the present invention is arranged with each of the first lens group $G_1$ and the second lens group $G_2$ being formed of three lens elements that are lens components so that a compact six-lens-element and six-lens-component construction overall is achieved. This zoom optical system of the present invention enables adopting a simpler construction with lower manufacturing costs than conventionally used.

Additionally, in the zoom optical system of the present invention, the entire lens system can be a bright lens system because the fourth lens element $L_4$ (L2-1) of the second lens group $G_2$ has a large outer diameter, has large positive refractive power, and its object-side surface is a convex surface having large curvature.

Also, the zoom optical system of the present invention enables maintaining good optical performance, such as minimizing spherical aberration, axial chromatic aberration, and other aberrations, while achieving compactness by satisfying the following Conditions (1)–(4):

$2.0 < |f_1/f_w| < 3.0$  Condition (1)

$1.0 < |f_2/f_1| < 1.8$  Condition (2)

$v_{d13} < 27$  Condition (3)

$v_{d22} < 27$  Condition (4)

where
  $f_1$ is the focal length of the first lens group $G_1$,
  $f_w$ is the focal length of the entire zoom optical system at the wide-angle end,
  $f_2$ is the focal length of the second lens group $G_2$,
  $v_{d13}$ is the Abbe number at the d-line of the third lens element $L_3$ (L1-3), and
  $v_{d22}$ is the Abbe number at the d-line of the fifth lens element $L_5$ (L2-2).

Condition (1) above prescribes the focal length $f_1$ of the first lens group $G_1$ and prescribes a range in which the spherical aberration can be well maintained along with compactness of the zoom optical system. Namely, if the lower limit of Condition (1) above is not satisfied, it becomes difficult to maintain good optical performance because the negative refractive power of the first lens group $G_1$ is increased and the spherical aberration at the telephoto end is under-corrected. On the other hand, if the upper limit of Condition (1) above is not satisfied, the negative refractive power of the first lens group $G_1$ is decreased and achieving compactness becomes difficult.

Condition (2) above prescribes the ratio of the focal length $f_2$ of the second lens group $G_2$ to the focal length $f_1$ of the first lens group $G_1$ and prescribes a range wherein the spherical aberration can be well maintained along with compactness of the zoom optical system. Namely, if the lower limit of Condition (2) above is not satisfied, it becomes difficult to maintain good optical performance because the positive refractive power of the second lens group $G_2$ is increased and the spherical aberration at the wide-angle end is overcorrected. On the other hand, if the upper limit of Condition (2) is not satisfied, the positive refractive power of the second lens group $G_2$ is decreased and achieving compactness becomes difficult.

Conditions (3) and (4) above concern Abbe numbers, and if Conditions (3) and (4) above are not satisfied, the correction of axial chromatic aberration is difficult and the desired optical performance cannot be maintained. Moreover, it is desired that $v_{d13} = v_{d22}$ in order to further improve the axial chromatic aberration.

According to the zoom optical system of the present invention, a less expensive zoom optical system with a simpler construction can be obtained while ensuring the same or better performance than before not only in terms of compactness and zoom ratio but also in terms of optical performance. This is achieved by adopting a construction of a first lens group having negative refractive power and including three lens elements and a second lens group having positive refractive power and including three lens elements with one of the three lens elements having positive refractive power and an aspheric surface on the object side.

Embodiments 1–3 of the present invention will now be individually described with further reference to the drawings.

Embodiment 1

FIG. 1 shows a cross-sectional view of Embodiment 1 of the zoom optical system of the present invention at the wide-angle end.

Table 1 below lists the surface number #, in order from the object side, the radius of curvature R (in mm) of each surface on the optical axis, the on-axis surface spacing D (in mm), except that the on-axis surface spacings that vary with zooming are listed in Table 3 below, as well as the refractive index $N_d$ and the Abbe number $v_d$ at the d-line (587.6 nm) of each optical element for Embodiment 1. Note that although R is the on-axis radius of curvature, for convenience of illustration, in FIG. 1 the lead lines from the R reference symbols extend to the surfaces being referenced but do not extend to the on-axis positions.

TABLE 1

| #  | R         | D            | $N_d$   | $v_d$ |
|----|-----------|--------------|---------|-------|
| 1  | 24.3451   | 0.80         | 1.80400 | 46.6  |
| 2  | 6.0668    | 4.12         |         |       |
| 3  | −17.4277  | 0.70         | 1.77250 | 49.6  |
| 4  | 19.5461   | 0.80         |         |       |
| 5  | 16.7653   | 2.20         | 1.84666 | 23.8  |
| 6  | −584.5234 | D6 (variable)|         |       |
| 7  | ∞ (stop)  | D7 (variable)|         |       |
| 8* | 7.4627    | 4.68         | 1.69350 | 53.2  |
| 9* | −31.7372  | 0.86         |         |       |
| 10 | 14.1313   | 0.65         | 1.92286 | 18.9  |
| 11 | 5.9827    | 0.89         |         |       |
| 12 | 10.3454   | 2.86         | 1.62299 | 58.2  |

TABLE 1-continued

| # | R | D | $N_d$ | $v_d$ |
|---|---|---|---|---|
| 13 | −24.8939 | D13 (variable) | | |
| 14 | ∞ | 4.00 | 1.51633 | 64.1 |
| 15 | ∞ | | | |

The surfaces with a * to the right of the surface number in Table 1 are aspheric lens surface, and the aspheric surface shapes are expressed by Equation (A) above. As indicated in Table 1, both surfaces of the lens element $L_4$ (L2-1) of the second lens group $G_2$ are aspheric.

Table 2 below lists the values of the constant K and the aspherical coefficients $A_3$–$A_{16}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 8 | 1.08925 | 3.00E−4 | −5.47E−4 | 8.16E−5 | −9.83E−6 |
| 9 | −2.3457779 | 2.26E−4 | 6.53E−5 | 2.68E−5 | 1.45E−5 |

| # | $A_7$ | $A_8$ | $A_9$ | $A_{10}$ | $A_{11}$ |
|---|---|---|---|---|---|
| 8 | −9.30E−7 | −3.85E−8 | 6.43E−8 | −6.24E−9 | −1.33E−10 |
| 9 | −7.78E−6 | 1.26E−6 | −6.49E−8 | −1.36E−10 | −4.86E−11 |

| # | $A_{12}$ | $A_{13}$ | $A_{14}$ | $A_{15}$ | $A_{16}$ |
|---|---|---|---|---|---|
| 8 | −1.70E−11 | 2.62E−12 | 7.32E−13 | −1.59E−13 | 3.37E−15 |
| 9 | −6.64E−12 | 1.18E−12 | 2.25E−12 | −5.26E−13 | 3.38E−14 |

In the zoom optical system of Embodiment 1, both the first lens group $G_1$ and the second lens group $G_2$ move during zooming. Therefore, the on-axis spacings D6, D7, and D13 change with zooming. With zooming, the focal length f, the f-number $F_{NO}$, and the field angle, that is, the angle of view, 2ω of the zoom optical system also change. Table 3 below lists the values of the focal length f (in mm), the f-number $F_{NO}$, the field angle 2ω (in degrees), and the variables D6, D7, and D13 (in mm) at the wide-angle end (f=2.88 mm) and at the telephoto end (f=9.95 mm) when the zoom optical system is focused at infinity.

TABLE 3

| f | $F_{NO}$ | 2ω | D6 | D7 | D13 |
|---|---|---|---|---|---|
| 2.88 | 1.35 | 129 | 10.80 | 9.65 | 1.00 |
| 9.95 | 3.01 | 35 | 1.59 | 0.50 | 10.15 |

The zoom optical system of Embodiment 1 of the present invention satisfies Conditions (1)–(4) above as set forth in Table 4 below.

TABLE 4

| Condition No. | Condition | Value |
|---|---|---|
| (1) | $2.0 < |f_1/f_w| < 3.0$ | 2.63 |
| (2) | $1.0 < |f_2/f_1| < 1.8$ | 1.30 |
| (3) | $vd_{13} < 27$ | 23.8 |
| (4) | $vd_{22} < 27$ | 18.9 |

Figure 2A:
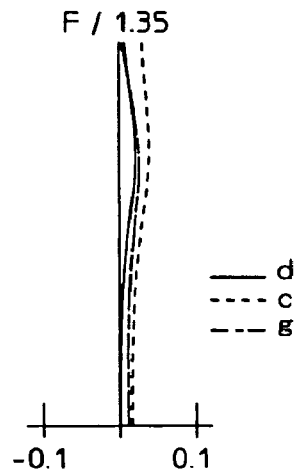
FIGS. 2A–2C show aberrations of Embodiment 1 of the zoom optical system of the present invention at the wide-angle end.
Figure 2B:
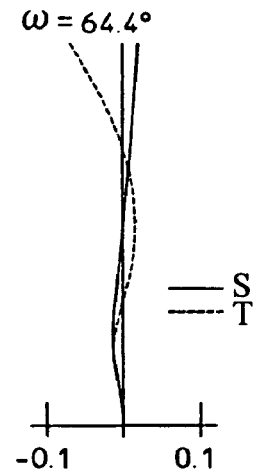
Figure 2C:
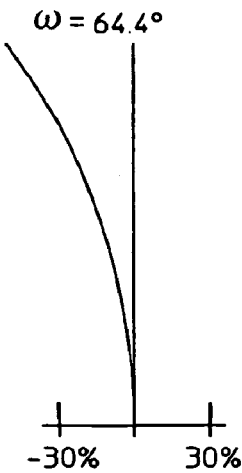
Figure 2D:
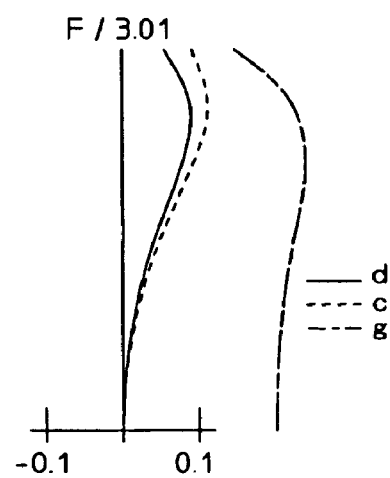
FIGS. 2D–2F show aberrations of Embodiment 1 of the zoom optical system of the present invention at the telephoto end.
Figure 2E:
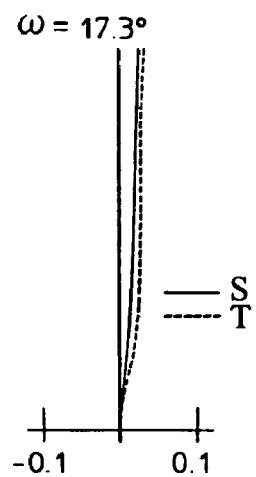
Figure 2F:
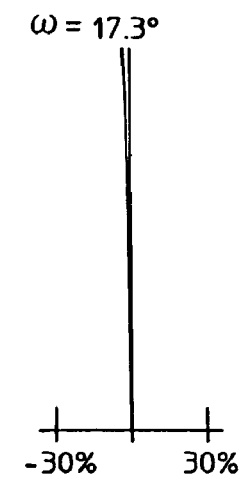

FIGS. 2A–2C show the spherical aberration, astigmatism, and distortion, respectively, of the zoom optical system of Embodiment 1 at the wide-angle end. FIGS. 2D–2F show the spherical aberration, astigmatism, and distortion, respectively, of the zoom optical system of Embodiment 1 at the telephoto end. In FIGS. 2A and 2D, the spherical aberration (in mm) is shown for the wavelengths 587.6 nm (the d-line), 435.8 nm (the g-line), and 656.3 nm (the C-line), and the f-number is shown. In the remaining figures, ω is the half-field angle. In FIGS. 2B and 2E, the astigmatism (in mm) is shown for both the sagittal image surface S (solid line) and the tangential image surface T (broken line) and is measured at 587.6 nm (the d-line). In FIGS. 2C and 2F, distortion (in per cent) is measured at 587.6 nm (the d-line).

As shown by Table 3 above and FIGS. 2A–2F, the zoom optical system of Embodiment 1 is a high performance zoom optical system with an f-number in the range of 1.35 to 3.01, provides a wide field angle, 2ω, from about thirty-five degrees to about one hundred twenty-nine degrees, and provides good correction of aberrations.

In the zoom optical system of the present invention, as shown in Embodiment 1 described above, a greater aberration correcting effect can be obtained by making the fourth lens element $L_4$ (L2-1) of the second lens group $G_2$ to be a biconvex lens element with both surfaces being aspheric.

Embodiment 2

Figure 3:
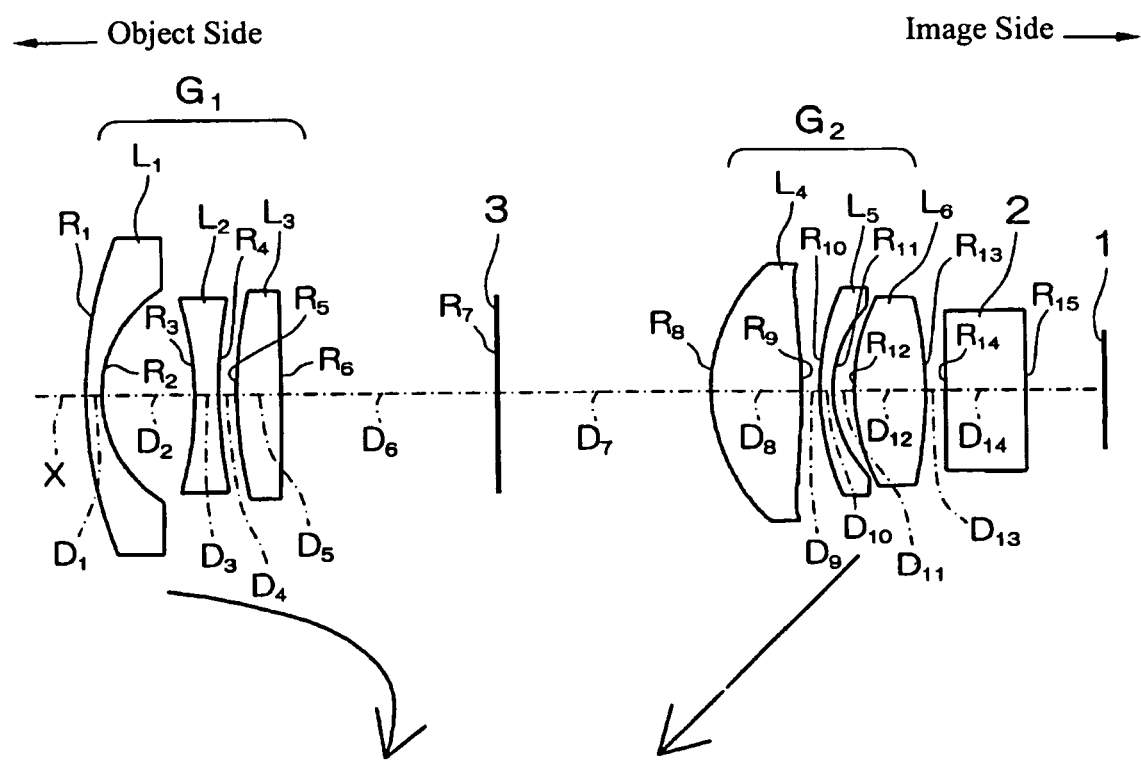
FIG. 3 shows a cross-sectional view of Embodiment 2 of the zoom optical system of the present invention at the wide-angle end.

FIG. 3 shows a cross-sectional view of Embodiment 2 of the zoom optical system of the present invention at the wide-angle end.

Table 5 below lists the surface number #, in order from the object side, the radius of curvature R (in mm) of each surface on the optical axis, the on-axis surface spacing D (in mm), except that the on-axis surface spacings that vary with zooming are listed in Table 7 below, as well as the refractive index $N_d$ and the Abbe number $v_d$ at the d-line (587.6 nm) of each optical element for Embodiment 2. Note that although R is the on-axis radius of curvature, for convenience of illustration, in FIG. 3 the lead lines from the R reference symbols extend to the surfaces being referenced but do not extend to the on-axis positions.

TABLE 5

| # | R | D | $N_d$ | $v_d$ |
|---|---|---|---|---|
| 1 | 21.6493 | 0.80 | 1.83481 | 42.7 |
| 2 | 6.2423 | 4.69 | | |
| 3 | −16.3896 | 1.19 | 1.83481 | 42.7 |
| 4 | 25.1601 | 0.88 | | |
| 5 | 21.4984 | 2.26 | 1.92286 | 18.9 |
| 6 | −247.8664 | D6 (variable) | | |
| 7 | ∞ (stop) | D7 (variable) | | |
| 8* | 7.7918 | 4.53 | 1.69350 | 53.2 |
| 9* | −31.2587 | 0.94 | | |
| 10 | 12.8278 | 0.65 | 1.92286 | 18.9 |
| 11 | 6.0420 | 1.08 | | |
| 12 | 10.1349 | 3.61 | 1.49700 | 81.6 |
| 13 | −20.6523 | D13 (variable) | | |
| 14 | ∞ | 4.00 | 1.51633 | 64.1 |
| 15 | ∞ | | | |

The surfaces with a * to the right of the surface number in Table 5 are aspheric lens surfaces, and the aspheric surface shapes are expressed by Equation (A) above. As indicated in Table 5, both surfaces of the lens element $L_4$ (L2-1) of the second lens group $G_2$ are aspheric.

Table 6 below lists the values of the constant K and the aspherical coefficients $A_3$–$A_{16}$ used in Equation (A) above for each of the aspheric lens surfaces of Table 5. Aspheric coefficients that are not present in Table 6 are zero. An "E"

in the data indicates that the number following the "E" is the exponent to the base 10. For example, "1.0E-2" represents the number $1.0 \times 10^{-2}$.

TABLE 6

| # | K | $A_3$ | $A_4$ | $A_5$ | $A_6$ |
|---|---|---|---|---|---|
| 8 | 1.2489283 | 2.04E-4 | -5.39E-4 | 8.55E-5 | -1.05E-5 |
| 9 | -3.8730684 | 1.66E-4 | 1.30E-5 | 3.79E-5 | 1.47E-5 |

| # | $A_7$ | $A_8$ | $A_9$ | $A_{10}$ | $A_{11}$ |
|---|---|---|---|---|---|
| 8 | -1.03E-6 | -4.18E-8 | 6.39E-8 | -6.27E-9 | -1.32E-10 |
| 9 | -7.90E-6 | 1.24E-6 | -6.58E-8 | -1.48E-10 | -4.40E-11 |

| # | $A_{12}$ | $A_{13}$ | $A_{14}$ | $A_{15}$ | $A_{16}$ |
|---|---|---|---|---|---|
| 8 | -1.60E-11 | 2.86E-12 | 7.63E-13 | -1.59E-13 | 1.39E-15 |
| 9 | -6.20E-12 | 1.12E-12 | 2.29E-12 | -5.02E-13 | 4.29E-14 |

In the zoom optical system of Embodiment 2, both the first lens group $G_1$ and the second lens group $G_2$ move during zooming. Therefore, the on-axis spacings D6, D7, and D13 change with zooming. With zooming, the focal length f, the f-number $F_{NO}$, and the field angle, that is, the angle of view, 2ω, of the zoom optical system also change. Table 7 below lists the values of the focal length f (in mm), the f-number $F_{NO}$, the field angle 2ω (in degrees), and the variables D6, D7, and D13 (in mm) at the wide-angle end (f=2.88 mm) and at the telephoto end (f=9.95 mm) when the zoom optical system is focused at infinity.

TABLE 7

| f | $F_{NO}$ | 2ω | D6 | D7 | D13 |
|---|---|---|---|---|---|
| 2.88 | 1.28 | 129 | 10.87 | 10.87 | 1.00 |
| 9.95 | 2.89 | 35 | 1.76 | 0.83 | 11.04 |

The zoom optical system of Embodiment 2 of the present invention satisfies Conditions (1)–(4) above as set forth in Table 8 below.

TABLE 8

| Condition No. | Condition | Value |
|---|---|---|
| (1) | $2.0 < |f_1/f_w| < 3.0$ | 2.57 |
| (2) | $1.0 < |f_2/f_1| < 1.8$ | 1.42 |
| (3) | $vd_{13} < 27$ | 18.9 |
| (4) | $vd_{22} < 27$ | 18.9 |

Figure 4A:
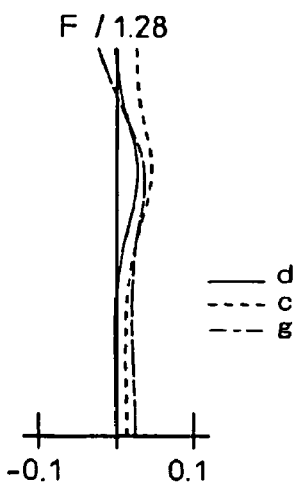
FIGS. 4A–4C show aberrations of Embodiment 2 of the zoom optical system of the present invention at the wide-angle end.
Figure 4B:
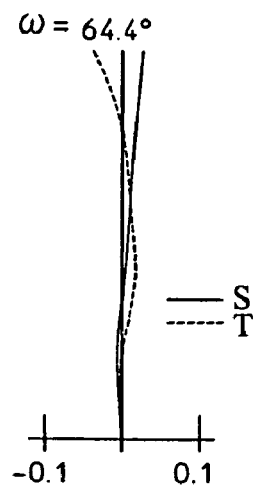
Figure 4C:
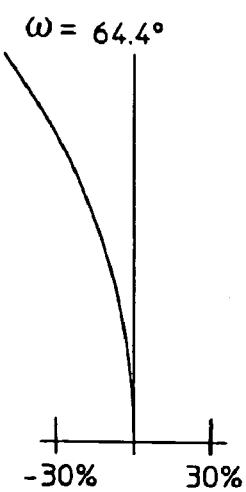
Figure 4D:
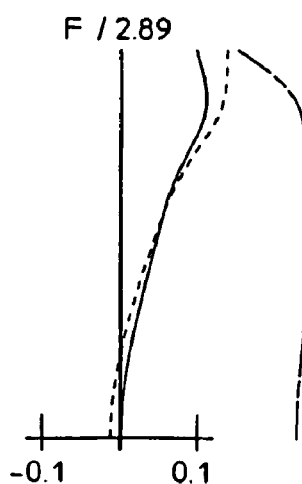
FIGS. 4D–4F show aberrations of Embodiment 2 of the zoom optical system of the present invention at the telephoto end.
Figure 4E:
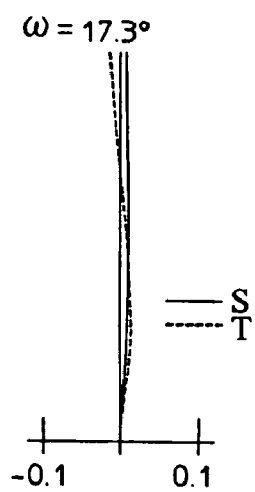
Figure 4F:

FIGS. 4A–4C show the spherical aberration, astigmatism, and distortion, respectively, of the zoom optical system of Embodiment 2 at the wide-angle end. FIGS. 4D–4F show the spherical aberration, astigmatism, and distortion, respectively, of the zoom optical system of Embodiment 2 at the telephoto end. In FIGS. 4A and 4D, the spherical aberration (in mm) is shown for the wavelengths 587.6 nm (the d-line), 435.8 nm (the g-line), and 656.3 nm (the C-line), and the f-number is shown. In the remaining figures, ω is the half-field angle. In FIGS. 4B and 4E, the astigmatism (in mm) is shown for both the sagittal image surface S (solid line) and the tangential image surface T (broken line) and is measured at 587.6 nm (the d-line). In FIGS. 4C and 4F, distortion (in per cent) is measured at 587.6 mn (the d-line).

As shown by Table 7 above and FIGS. 4A–4F, the zoom optical system of Embodiment 2 is a high performance zoom optical system with an f-number in the range of 1.28 to 2.89, provides a wide field angle, 2ω, from about thirty-five degrees to about one hundred twenty-nine degrees, and provides good correction of aberrations.

Embodiment 3

Figure 5:
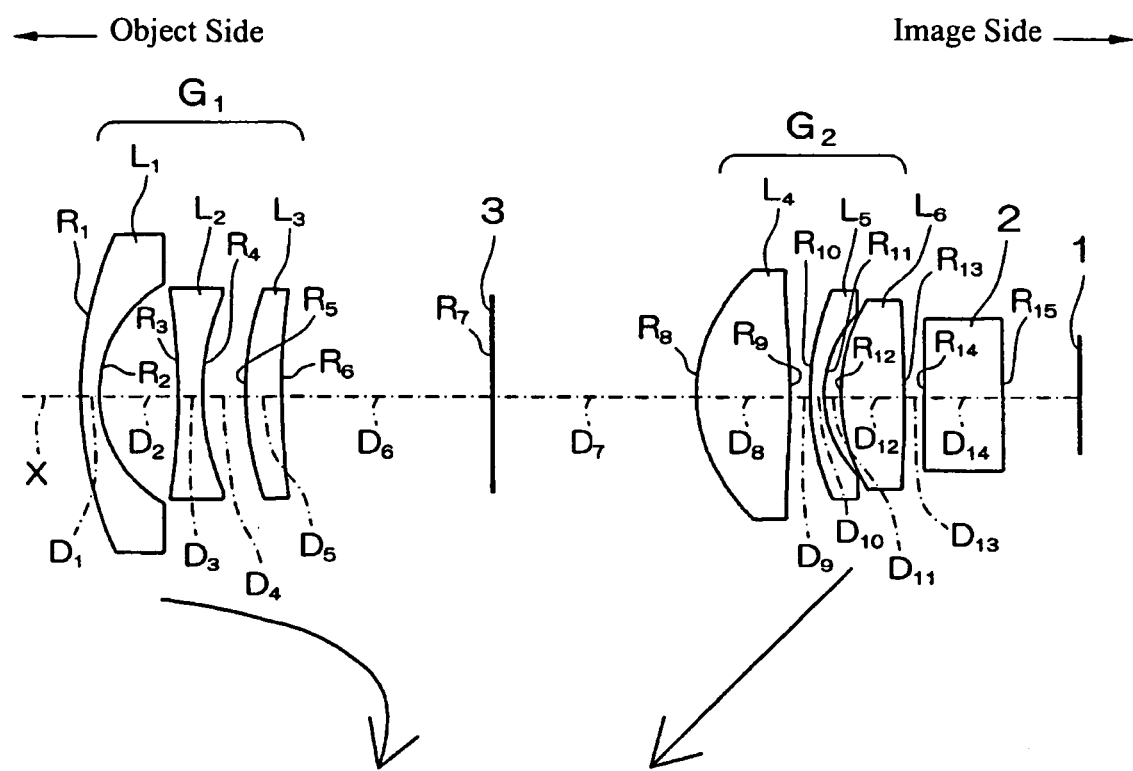
FIG. 5 shows a cross-sectional view of Embodiment 3 of the zoom optical system of the present invention at the wide-angle end.

FIG. 5 shows a cross-sectional view of Embodiment 3 of the zoom optical system of the present invention at the wide-angle end.

Table 9 below lists the surface number #, in order from the object side, the radius of curvature R (in mm) of each surface on the optical axis, the on-axis surface spacing D (in mm), except that the on-axis surface spacings that vary with zooming are listed in Table 11 below, as well as the refractive index $N_d$ and the Abbe number $v_d$ at the d-line (587.6 nm) of each optical element for Embodiment 3. Note that although R is the on-axis radius of curvature, for convenience of illustration, in FIG. 5 the lead lines from the R reference symbols extend to the surfaces being referenced but do not extend to the on-axis positions.

TABLE 9

| # | R | D | $N_d$ | $v_d$ |
|---|---|---|---|---|
| 1 | 19.1939 | 0.94 | 1.80400 | 46.6 |
| 2 | 6.3225 | 3.97 | | |
| 3 | -31.5965 | 1.20 | 1.80400 | 46.6 |
| 4 | 11.8748 | 2.18 | | |
| 5 | 15.5481 | 1.83 | 1.92286 | 18.9 |
| 6 | 39.0734 | D6 (variable) | | |
| 7 | ∞ (stop) | D7 (variable) | | |
| 8* | 7.4739 | 4.67 | 1.69350 | 53.2 |
| 9* | -38.6779 | 1.02 | | |
| 10 | 13.4676 | 0.65 | 1.92286 | 18.9 |
| 11 | 5.6571 | 0.87 | | |
| 12 | 9.2509 | 3.21 | 1.72916 | 54.7 |
| 13 | -89.2074 | D13 (variable) | | |
| 14 | ∞ | 4.00 | 1.51633 | 64.1 |
| 15 | ∞ | | | |

The surfaces with a * to the right of the surface number in Table 9 are aspheric lens surfaces, and the aspheric surface shapes are expressed by Equation (A) above. As indicated in Table 9, both surfaces of the lens element $L_4$ (L2-1) of the second lens group $G_2$ are aspheric.

Table 10 below lists the values of the constant K and the aspherical coefficients $A_3$–$A_{16}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E-2" represents the number $1.0 \times 10^{-2}$.

TABLE 10

| # | K | $A_3$ | $A_4$ | $A_5$ | $A_6$ |
|---|---|---|---|---|---|
| 8 | 1.2470707 | 2.90E-4 | -5.41E-4 | 8.14E-5 | -1.11E-5 |
| 9 | 3.2039593 | 3.68E-4 | -1.44E-5 | 3.65E-5 | 1.49E-5 |

| # | $A_7$ | $A_8$ | $A_9$ | $A_{10}$ | $A_{11}$ |
|---|---|---|---|---|---|
| 8 | -1.09E-6 | -4.50E-8 | 6.41E-8 | -6.23E-9 | -1.30E-10 |
| 9 | -7.86E-6 | 1.25E-6 | -6.56E-8 | -1.79E-10 | -5.31E-11 |

| # | $A_{12}$ | $A_{13}$ | $A_{14}$ | $A_{15}$ | $A_{16}$ |
|---|---|---|---|---|---|
| 8 | -1.77E-11 | 2.18E-12 | 5.81E-13 | -2.01E-13 | -7.06E-15 |
| 9 | -7.86E-12 | 8.34E-13 | 2.23E-12 | -5.20E-13 | 3.78E-14 |

In the zoom optical system of Embodiment 3, both the first lens group $G_1$ and the second lens group $G_2$ move during zooming. Therefore, the on-axis spacings D6, D7, and D13 change with zooming. With zooming, the focal length f, the f-number $F_{NO}$, and the field angle, that is, the angle of view, 2ω, of the zoom optical system also change. Table 11 below lists the values of the focal length f (in mm), the f-number $F_{NO}$, the field angle 2ω (in degrees), and the variables D6, D7, and D13 (in mm) at the wide-angle end (f=2.70 mm) and at the telephoto end (f=8.11 mm) when the zoom optical system is focused at infinity.

TABLE 11

| f | $F_{NO}$ | 2ω | D6 | D7 | D13 |
|---|---|---|---|---|---|
| 2.70 | 1.38 | 132 | 10.58 | 10.48 | 1.00 |
| 8.11 | 2.89 | 42 | 1.53 | 2.55 | 8.92 |

The zoom optical system of Embodiment 3 of the present invention satisfies Conditions (1)–(4) above as set forth in Table 12 below.

TABLE 12

| Condition No. | Condition | Value |
|---|---|---|
| (1) | $2.0 < |f_1/f_w| < 3.0$ | 2.54 |
| (2) | $1.0 < |f_2/f_1| < 1.8$ | 1.46 |
| (3) | $vd_{13} < 27$ | 18.9 |
| (4) | $vd_{22} < 27$ | 18.9 |

Figure 6A:
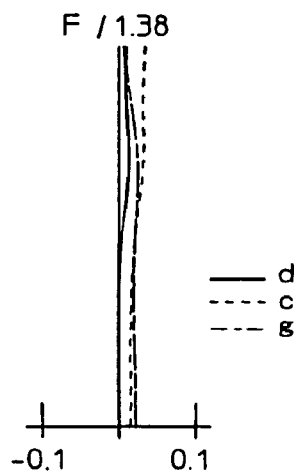
FIGS. 6A–6C show aberrations of Embodiment 3 of the zoom optical system of the present invention at the wide-angle end.
Figure 6B:
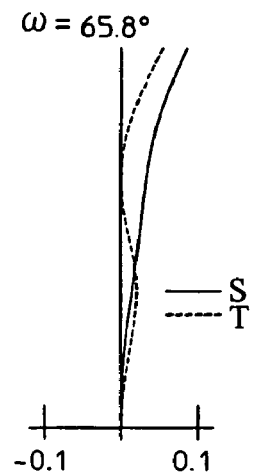
Figure 6C:
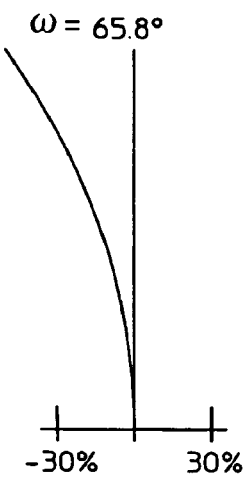
Figure 6D:
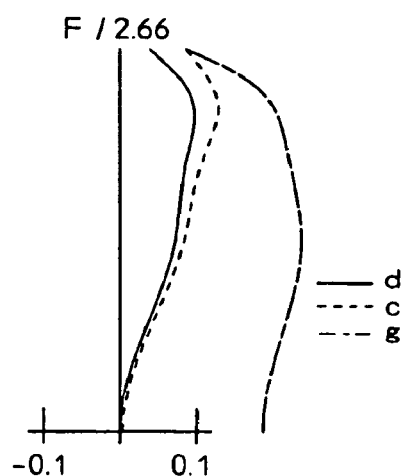
FIGS. 6D–6F show aberrations of Embodiment 3 of the zoom optical system of the present invention at the telephoto end.
Figure 6E:
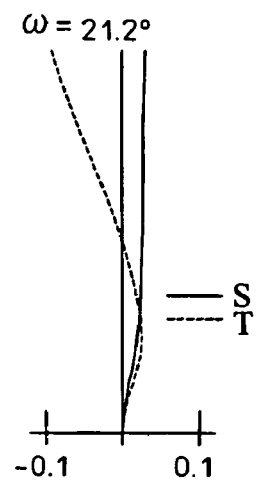
Figure 6F:
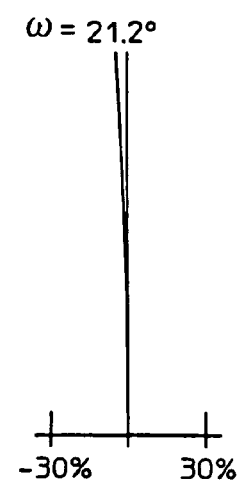

FIGS. 6A–6C show the spherical aberration, astigmatism, and distortion, respectively, of the zoom optical system of Embodiment 3 at the wide-angle end. FIGS. 6D–6F show the spherical aberration, astigmatism, and distortion, respectively, of the zoom optical system of Embodiment 3 at the telephoto end. In FIGS. 6A and 6D, the spherical aberration (in mm) is shown for the wavelengths 587.6 nm (the d-line), 435.8 nm (the g-line), and 656.3 nm (the C-line), and the f-number is shown. In the remaining figures, ω is the half-field angle. In FIGS. 6B and 6E, the astigmatism (in mm) is shown for both the sagittal image surface S (solid line) and the tangential image surface T (broken line) and is measured at 587.6 nm (the d-line). In FIGS. 6C and 6F, distortion (in per cent) is measured at 587.6 nm (the d-line).

As shown by Table 11 above and FIGS. 6A–6F, the zoom optical system of Embodiment 3 is a high performance zoom optical system with an f-number in the range of 1.38 to 2.89, provides a wide field angle, 2ω, from about forty-two degrees to about one hundred thirty-two degrees, and provides good correction of aberrations.

The present invention is not limited to the aforementioned embodiments, as it will be obvious that various alternative implementations are possible. For instance, values such as the radius of curvature R of each of the lens components, the surface spacings D, the refractive index N, as well as the Abbe number ν, are not limited to the examples indicated in each of the aforementioned embodiments, as other values can be adopted. Also, for the zoom optical system of the present inventions, optical performance can be improved by using aspheric surfaces on lens elements other than the object-most lens element, the fourth lens $L_4$ (L2-1), of the second lens group $G_2$. Additionally, although glass is used as the lens material of the lens elements in the examples above, plastic may also be used, especially for lens elements that include aspheric surfaces in order to reduce manufacturing costs associated with obtaining aspheric surfaces. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom optical system comprising, arranged along an optical axis in order from the object side as follows:
    a first lens group having negative refractive power and consisting of three lens elements;
    a stop; and
    a second lens group having positive refractive power and consisting of three lens elements;
wherein
    both the first lens group and the second lens group move along the optical axis during zooming;
    the object-side lens element of said second lens group has positive refractive power and has at least one aspheric surface;
    said second lens group includes, arranged along the optical axis in order from the object side, as follows
        said object-side lens element;
        a fifth lens element having negative refractive power and a meniscus shape with its concave surface on the image side; and
        a biconvex sixth lens element;
    said three lens elements of said first lens group are arranged along the optical axis in order from the object side as follows:
    a first lens element having negative refractive power and a meniscus shape with its concave surface on the image side;
    a biconcave second lens element; and
    a third lens element having positive refractive power.

2. A zoom optical system comprising, arranged along an optical axis in order from the object side as follows:
    a first lens group having negative refractive power and consisting of three lens elements;
    a stop; and
    a second lens group having positive refractive power and consisting of three lens elements;
wherein,
    both the first lens group and the second lens group move along the optical axis during zooming;
    the object-side lens element of said second lens group has positive refractive power and has at least one aspheric surface;
    said second lens group includes, arranged along the optical axis in order from the object side, as follows
        said object-side lens element;
        a fifth lens element having negative refractive power and a meniscus shape with its concave surface on the image side;
        a biconvex sixth lens element; and
    during zooming from the wide-angle end to the telephoto end, said first lens group moves along the optical axis first toward the image side and then toward the object side and said second lens group moves toward the object side.

3. A zoom optical system comprising, arranged along an optical axis in order from the object side as follows:
    a first lens group having negative refractive power and consisting of three lens elements;
    a stop; and
    a second lens group having positive refractive power and consisting of three lens elements;
wherein
    both the first lens group and the second lens group move along the optical axis during zooming;

the object-side lens element of said second lens group has positive refractive power and has at least one aspheric surface;

said three lens elements of said first lens group are arranged along the optical axis in order from the object side as follows
- a first lens element having negative refractive power and a meniscus shape with its concave surface on the image side;
- a biconcave second lens element; and
- a third lens element having positive refractive power; and the following conditions are satisfied $$2.0 < |f_1/f_w| < 3.0$$

$$1.0 < |f_2/f_1| < 1.8$$

$$v_{d13} < 27$$

where
- $f_1$ is the focal length of said first lens group,
- $f_w$ is the focal length of the entire zoom optical system at the wide-angle end,
- $f_2$ is the focal length of said second lens group, and
- $v_{d13}$ is the Abbe number at the d-line of said third lens element.

4. The zoom optical system of claim 1, wherein the following conditions are satisfied:

$$2.0 < |f_1/f_w| < 3.0$$

$$1.0 < |f_2/f_1| < 1.8$$

$$v_{d13} < 27$$

$$v_{d22} < 27$$

where
- $f_1$ is the focal length of said first lens group,
- $f_w$ is the focal length of the entire zoom optical system at the wide-angle end,
- $f_2$ is the focal length of said second lens group,
- $v_{d13}$ is the Abbe number at the d-line of said third lens element, and
- $v_{d22}$ is the Abbe number at the d-line of said fifth lens element.

5. A zoom optical system comprising, arranged along an optical axis in order from the object side as follows:
- a first lens group having negative refractive power and consisting of three lens elements;
- a stop; and
- a second lens group having positive refractive power and consisting of three lens elements;

wherein
- both the first lens group and the second lens group move along the optical axis during zooming;
- the object-side lens element of said second lens group has positive refractive power and has at least one aspheric surface; and the following conditions are satisfied $$2.0 < |f_1/f_w| < 3.0$$

$$1.0 < |f_2/f_1| < 1.8$$

where
- $f_1$ is the focal length of said first lens group,
- $f_w$ is the focal length of the entire zoom optical system at the wide-angle end, and
- $f_2$ is the focal length of said second lens group.

6. A zoom optical system comprising, arranged along an optical axis in order from the object side as follows:
- a first lens group having negative refractive power and consisting of three lens elements;
- a stop; and
- a second lens group having positive refractive power and consisting of three lens elements;

wherein
- both the first lens group and the second lens group move along the optical axis during zooming;
- the object-side lens element of said second lens group has positive refractive power and has at least one aspheric surface;
- said second lens group includes, arranged along the optical axis in order from the object side, as follows said object-side lens element;
  - a fifth lens element having negative refractive power and a meniscus shape with its concave surface on the image side; and
  - a biconvex sixth lens element; and the following conditions are satisfied:

$$2.0 < |f_1/f_w| < 3.0$$

$$1.0 < |f_2/f_1| < 1.8$$

where
- $f_1$ is the focal length of said first lens group,
- $f_w$ is the focal length of the entire zoom optical system at the wide-angle end, and
- $f_2$ is the focal length of said second lens group.

* * * * *